US009605754B2

(12) United States Patent
Drosback

(10) Patent No.: US 9,605,754 B2
(45) Date of Patent: Mar. 28, 2017

(54) AUTOMATIC TRANSMISSION AND A DOG CLUTCH FOR AN AUTOMATIC TRANSMISSION

(71) Applicant: ZF Friedrichshafen AG, Friedrichshafen (DE)

(72) Inventor: David Edward Drosback, Greenville, SC (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/729,363

(22) Filed: Jun. 3, 2015

(65) Prior Publication Data

US 2016/0356378 A1    Dec. 8, 2016

(51) Int. Cl.
| | | |
|---|---|---|
| F16H 3/66 | (2006.01) | |
| F16H 61/28 | (2006.01) | |
| F16D 11/14 | (2006.01) | |
| F16D 28/00 | (2006.01) | |
| F16D 11/00 | (2006.01) | |

(52) U.S. Cl.
CPC ......... F16H 61/2807 (2013.01); F16D 11/14 (2013.01); F16D 28/00 (2013.01); F16H 3/66 (2013.01); *F16D 2011/004* (2013.01); *F16H 2200/0065* (2013.01); *F16H 2200/2012* (2013.01); *F16H 2200/2046* (2013.01); *F16H 2200/2064* (2013.01); *F16H 2200/2094* (2013.01)

(58) Field of Classification Search
CPC .... F16D 11/14; F16D 28/00; F16D 2011/004; F16H 61/2807; F16H 3/66; F16H 2200/0065; F16H 2200/2046; F16H 2200/2094; F16H 2200/2012; F16H 2200/2064

USPC .............. 475/275–291, 303, 330; 192/66.31, 192/66.32, 70.2, 70.27, 84.1, 84.9, 84.92, 192/84.94, 84.96

See application file for complete search history.

(56) References Cited

U.S. PATENT DOCUMENTS

| | | | | |
|---|---|---|---|---|
| 2,687,050 A * | 8/1954 | Brown | ................... | B62M 11/14 475/277 |
| 5,394,967 A * | 3/1995 | Bigley | ............... | B60K 17/3515 192/49 |
| 8,398,522 B2 * | 3/2013 | Bauknecht | ................ | F16H 3/66 475/275 |
| 2002/0074852 A1 * | 6/2002 | Scrivens | ................... | F16D 9/06 301/6.5 |
| 2002/0112934 A1 * | 8/2002 | Karambelas | ........ | B60K 17/3515 192/69.43 |
| 2012/0133175 A1 * | 5/2012 | Charnesky | ............... | B60J 10/86 296/146.4 |
| 2013/0270056 A1 * | 10/2013 | Mankame | ............... | F16D 23/12 192/84.5 |

* cited by examiner

*Primary Examiner* — Roger Pang
(74) *Attorney, Agent, or Firm* — Dority & Manning, P.A.

(57) ABSTRACT

A dog clutch for an automatic transmission includes a shape-memory alloy shifter. The shape-memory alloy shifter is configured for moving a sliding clutch along an axial direction between an engaged configuration and a disengaged configuration. A plurality of splines of a mating clutch meshes with a plurality of splines of the sliding clutch in the engaged configuration. A related automatic transmission is also provided.

18 Claims, 3 Drawing Sheets

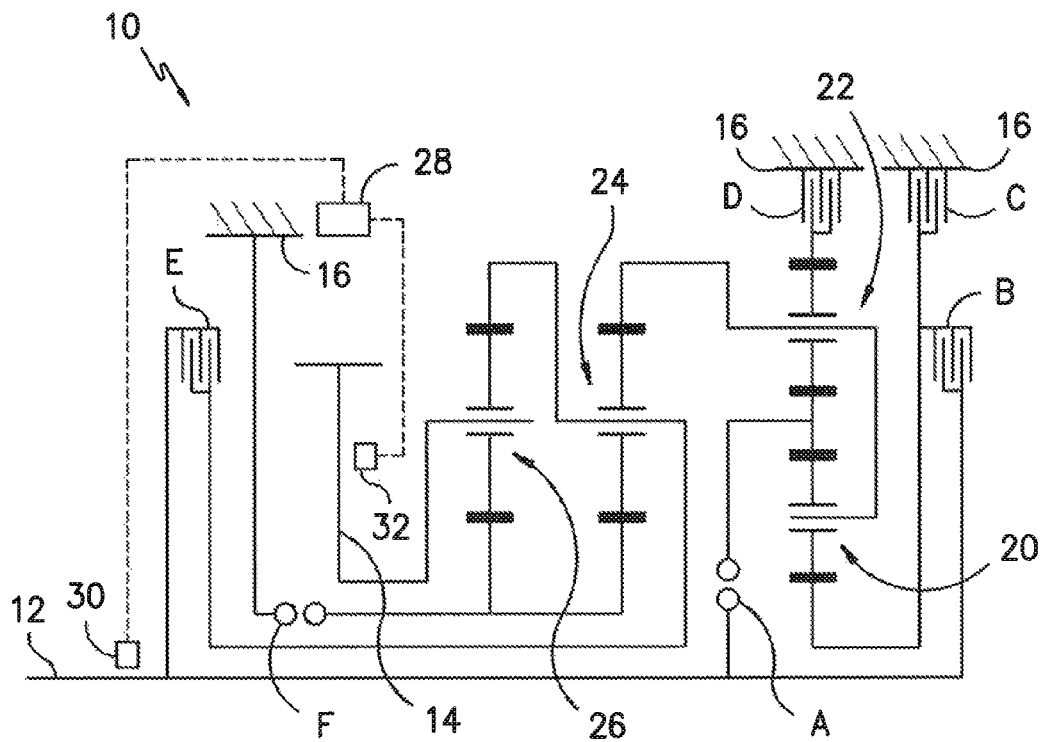
FIG. -1-
| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |
FIG. -2-

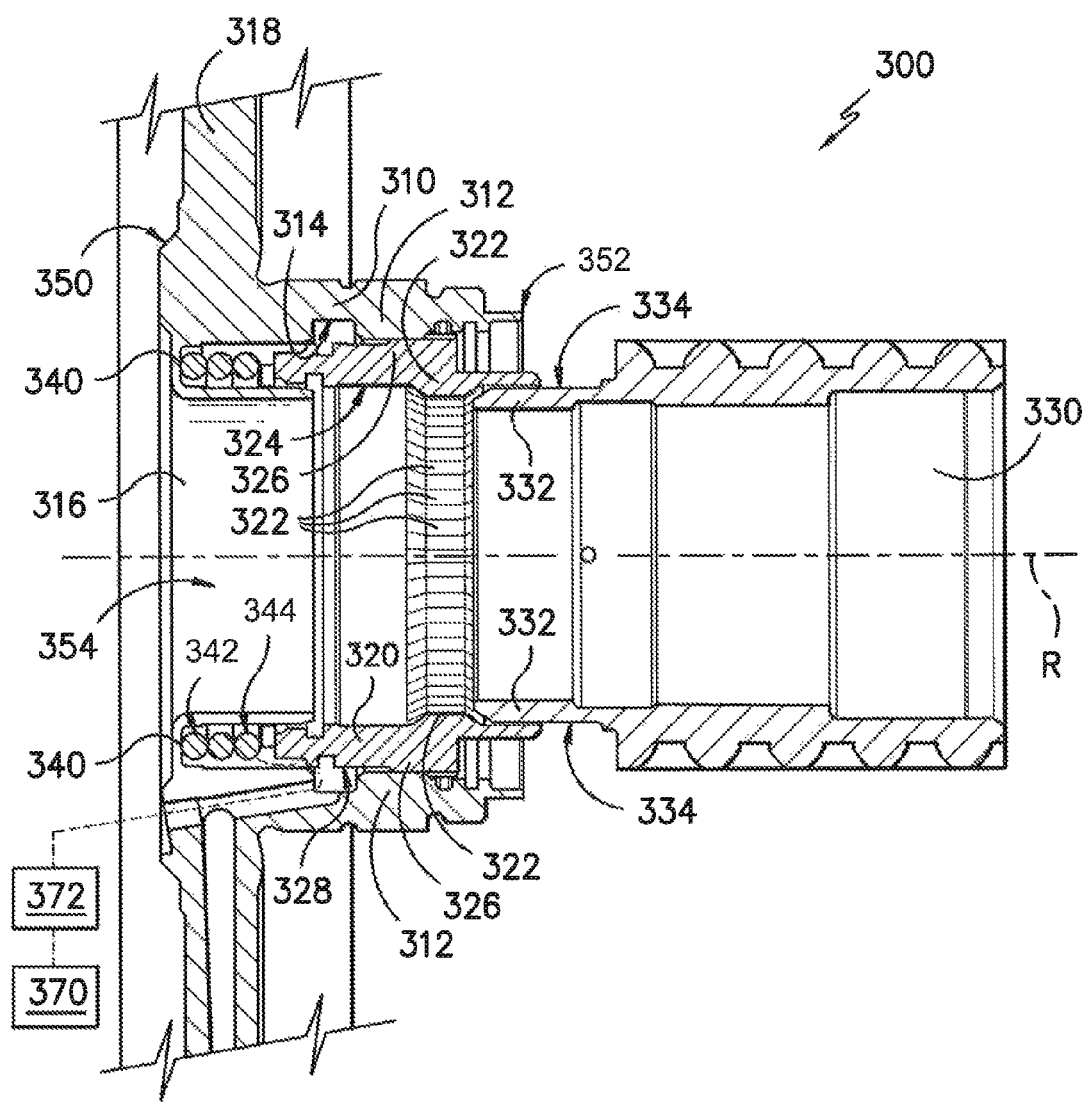
FIG. -3-

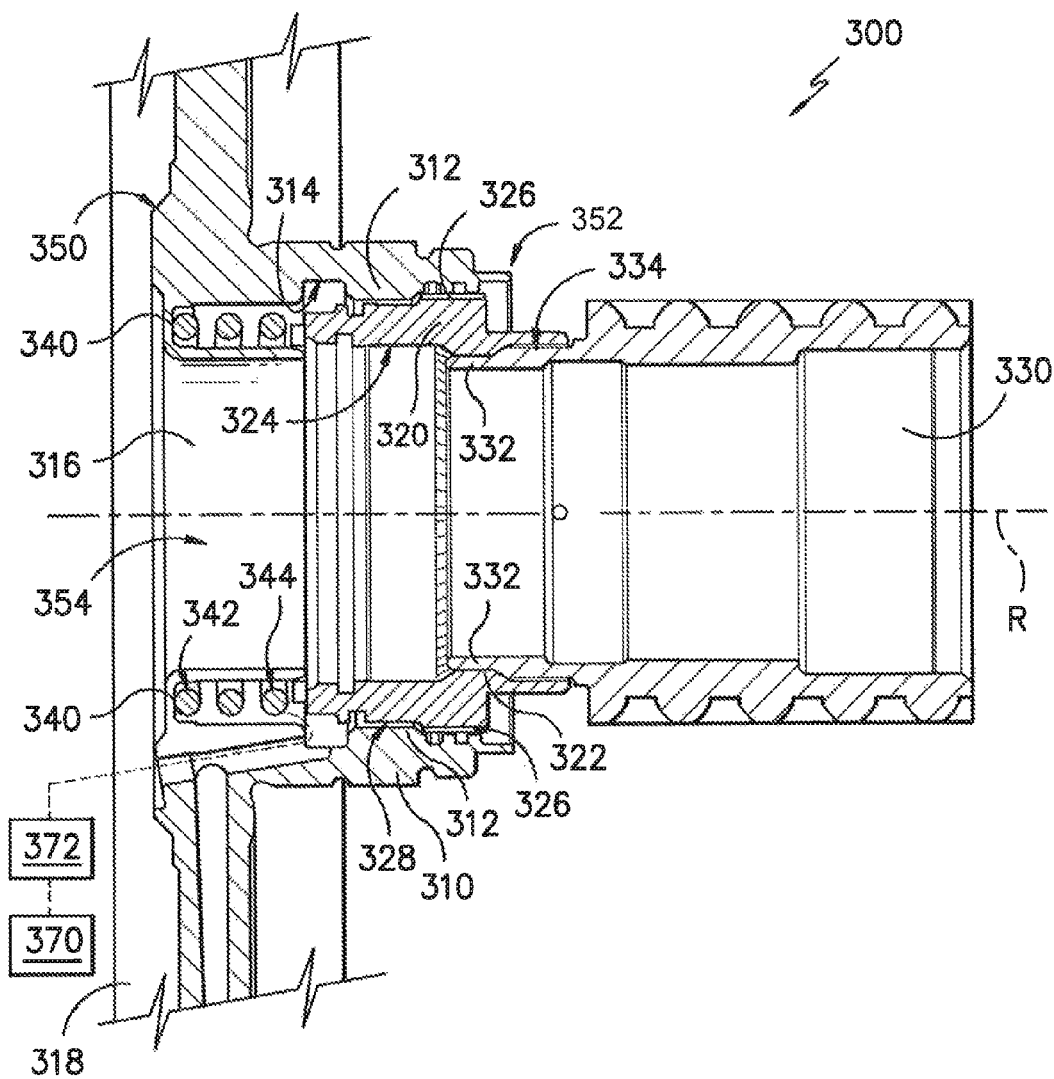
FIG. -4-

AUTOMATIC TRANSMISSION AND A DOG CLUTCH FOR AN AUTOMATIC TRANSMISSION

FIELD OF THE INVENTION

The present subject matter relates generally to automatic transmissions and shifting elements for automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Certain automatic transmissions include dog clutch shifting elements. During various gear shifts, the dog clutch is engaged or closed. Engaging the dog poses certain challenges. For example, certain dog clutches are hydraulically actuated. However, creating and maintaining the hydraulic pressure necessary to actuate the dog clutch can be difficult. In addition, hydraulically actuated dog clutches can require compliance with strict cleanliness guidelines in order to prevent debris from negatively affecting performance of the dog clutch. Further, hydraulically actuated dog clutches generally include O-rings, drilled passageways through cast materials and other components that can necessitate a complex transmission design.

Accordingly, an automatic transmission with features for assisting with actuating a shifting element of the automatic transmission would be useful. In particular, a dog clutch with features for assisting with actuating the dog clutch without hydraulic fluid would be useful.

BRIEF DESCRIPTION OF THE INVENTION

The present subject matter provides a dog clutch for an automatic transmission. The dog clutch includes a shape-memory alloy shifter. The shape-memory alloy shifter is configured for moving a sliding clutch along an axial direction between an engaged configuration and a disengaged configuration. A plurality of splines of a mating clutch meshes with a plurality of splines of the sliding clutch in the engaged configuration. A related automatic transmission is also provided. Additional aspects and advantages of the invention will be set forth in part in the following description, or may be apparent from the description, or may be learned through practice of the invention.

In a first exemplary embodiment, an automatic transmission is provided. The automatic transmission includes a plurality of planetary gear sets and a plurality of shifting elements, including a dog clutch that defines an axial direction. The dog clutch includes a clutch support and a sliding clutch mounted to the clutch support. The sliding clutch defines a plurality of splines. A shape-memory alloy shifter is coupled to the sliding clutch. The shape-memory alloy shifter is configured for moving the sliding clutch along the axial direction between an engaged configuration and a disengaged configuration. A mating clutch is mounted to a gear of the plurality of planetary gear sets. The mating clutch defines a plurality of splines. The plurality of splines of the mating clutch meshes with the plurality of splines of the sliding clutch in the engaged configuration. The plurality of splines of the mating clutch is not meshed with the plurality of splines of the sliding clutch in the disengaged configuration.

In a second exemplary embodiment, a dog clutch for an automatic transmission is provided. The dog clutch includes a clutch support and a sliding clutch mounted to the clutch support. The sliding clutch defines a plurality of splines. A shape-memory alloy shifter is coupled to the sliding clutch. The shape-memory alloy shifter is configured for moving the sliding clutch along an axial direction between an engaged configuration and a disengaged configuration. A mating clutch defines a plurality of splines. The plurality of splines of the mating clutch meshes with the plurality of splines of the sliding clutch in the engaged configuration. The plurality of splines of the mating clutch is not mesh with the plurality of splines of the sliding clutch in the disengaged configuration.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a schematic view of an automatic transmission according to an exemplary embodiment of the present subject matter.

FIG. 2 illustrates a table of an exemplary shifting scheme as may be used with the exemplary automatic transmission of FIG. 1.

FIGS. 3 and 4 provide section views of a dog clutch according to an exemplary embodiment of the present subject matter with the dog clutch shown in various positions.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to a motor of an associated vehicle. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or a turbine of an associated torque coupling. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc.

FIGS. 3 and 4 provide section views of a dog clutch 300 according to an exemplary embodiment of the present subject matter with dog clutch 300 shown in various positions. In FIG. 3, dog clutch 300 is shown in a disengaged configuration. Conversely, dog clutch 300 is shown in an engaged configuration in FIG. 4. Dog clutch 300 may be used in any suitable automatic transmission. For example, dog clutch 300 may be used in automatic transmission 10 as dog clutch A and/or dog clutch F (FIG. 1). Thus, while described in greater detail below in the context of automatic transmission 10, it will be understood that dog clutch 300 may be used in or with any other suitable transmission, such as a six-speed automatic transmission, an eight-speed automatic transmission, a ten-speed automatic transmission, etc., in alternative exemplary embodiments. As discussed in greater detail below, dog clutch 300 includes features for assisting with shifting dog clutch 300 between the engaged configuration and the disengaged configuration, e.g., without using hydraulic fluid.

As may be seen in FIGS. 3 and 4, dog clutch 300 includes a clutch support 310, a sliding clutch 320 and a mating clutch 330. Clutch support 310 may be mounted or fixed to any suitable component of automatic transmission 10, e.g., such that clutch support 310 does not rotate relative to such component. For example, clutch support 310 may be mounted or fixed to input shaft 12 when used as dog clutch A or to transmission housing 16 when used as dog clutch F. Mating clutch 330 may also be mounted or fixed to any suitable component of automatic transmission 10, e.g., such that mating clutch 330 does not rotate relative to such component. For example, mating clutch 330 may be mounted or fixed to the sun gear of second planetary gear set 22 and the ring gear of first planetary gear set 20 when used as dog clutch A or to the sun gear of third and fourth planetary gear sets 24, 26 when used as dog clutch F.

As discussed above, dog clutch 300 is adjustable between an engaged configuration and a disengaged configuration. In the engaged configuration, sliding clutch 320 engages mating clutch 330, e.g., such that clutch support 310 and mating clutch 330 rotate at a common angular velocity about an axis of rotation R. Conversely, in the disengaged configuration, sliding clutch 320 does not engage mating clutch 330, e.g., such that clutch support 310 and mating clutch 330 may rotate relative to each other about the axis of rotation R. As discussed in greater detail below, sliding clutch 320 is configured for moving axially, e.g., along the axis of rotation R, in order to shift dog clutch 300 between the engaged and disengaged configurations.

Clutch support 310 defines a plurality of projections or splines 312. Splines 312 of clutch support 310 may be positioned on or at an inner surface 314 of clutch support 310. Splines 312 of clutch support 310 may be milled, broached or otherwise suitably formed on inner surface 314 of clutch support 310. Splines 312 of clutch support 310 may also extend axially along the inner surface 314 of clutch support 310 and also radially inward from inner surface 314 of clutch support 310, as shown in FIG. 3. In particular, clutch support 310 defines an interior chamber 354. Inner surface 314 of clutch support 310 faces or is positioned adjacent interior chamber 354 of clutch support 310, and splines 312 of clutch support 310 extend radially inward from inner surface 314 of clutch support 310 into interior chamber 354 of clutch support 310. Clutch support 310 may have a generally cylindrical shape with a base plate 318 mounted thereto.

Mating clutch 330 also defines a plurality of projections or splines 332. Splines 332 of mating clutch 330 may be positioned on or at an outer surface 334 of mating clutch 330. Splines 332 of mating clutch 330 may be milled, broached or otherwise suitably formed on outer surface 334 of mating clutch 330. Splines 332 of mating clutch 330 may also extend axially along the outer surface 334 of mating clutch 330 and also radially outward from outer surface 334 of mating clutch 330, as shown in FIG. 3. Mating clutch 330 may have a generally cylindrical shape.

Sliding clutch 320 defines a first plurality of projections or splines 322 and a second plurality of projections or splines 326. First splines 322 of sliding clutch 320 may be positioned on or at an inner surface 324 of sliding clutch 320. First splines 322 of sliding clutch 320 may be milled, shaped, extruded or otherwise suitably formed on inner surface 324 of sliding clutch 320. First splines 322 of sliding clutch 320 may also extend axially along the inner surface 324 of sliding clutch 320 and also radially inward from inner surface 324 of sliding clutch 320, as shown in FIG. 3. The number and/or sizing of first splines 322 of sliding clutch 320 may correspond to or match the number and/or sizing of splines 332 of mating clutch 330. Thus, first splines 322 of sliding clutch 320 may mesh with splines 332 of mating clutch 330, as discussed in greater detail below. First splines 322 of sliding clutch 320 may also be uniformly distributed or spaced apart from one another on inner surface 324 of sliding clutch 320.

Second splines 326 of sliding clutch 320 may be positioned on or at an outer surface 328 of sliding clutch 320. Thus, second splines 326 of sliding clutch 320 may be positioned opposite first splines 322 of sliding clutch 320 on sliding clutch 320. Second splines 326 of sliding clutch 320 may be milled, shaped, extruded or otherwise suitably formed on outer surface 328 of sliding clutch 320. Second splines 326 of sliding clutch 320 may also extend axially along the outer surface 328 of sliding clutch 320 and also radially outward from outer surface 328 of sliding clutch 320, as shown in FIG. 3. The number and/or sizing of second splines 326 of sliding clutch 320 may correspond to or match the number and/or sizing of splines 312 of clutch support 310. Thus, second splines 326 of sliding clutch 320 may mesh with splines 312 of clutch support 310 in order to hinder rotation of sliding clutch 320 relative to clutch support 310 while permitting translation of sliding clutch 320 relative to clutch support 310, e.g., along the axis or rotation R. Second splines 326 of sliding clutch 320 may mesh with splines 312 of clutch support 310 in both the engaged and disengaged configurations. Second splines 326 of sliding clutch 320 may also be uniformly distributed or spaced apart from one another on outer surface 328 of sliding clutch 320.

Dog clutch 300 also includes a shape-memory alloy shifter 340. Shape-memory alloy shifter 340 is positioned adjacent sliding clutch 320 and is configured for selectively adjusting dog clutch 300 between the engaged configuration and the disengaged configuration. For example, an electrical current may be supplied to shape-memory alloy shifter 340, and shape-memory alloy shifter 340 may expand in order to move sliding clutch 320 relative to mating clutch 330. The electrical current to shape-memory alloy shifter 340 may be subsequently terminated, and shape-memory alloy shifter 340 may contract in order to move sliding clutch 320 relative to mating clutch 330. Such movement of sliding clutch 320 selectively engages first splines 322 of sliding clutch 320 with splines 332 of mating clutch 330 in order to shift dog clutch 300 between the engaged and disengaged configurations. In particular, shape-memory alloy shifter 340 positions sliding clutch 320 such that first splines 322 of sliding clutch 320 mesh with splines 332 of mating clutch 330 in the engaged configuration. Conversely, shape-memory alloy shifter 340 positions sliding clutch 320 such that first splines 322 of sliding clutch 320 do not mesh with splines 332 of mating clutch 330 in the disengaged configuration. Shape-memory alloy shifter 340 may be positioned within interior chamber 354 of clutch support 310.

As discussed above, expansion and contraction of shape-memory alloy shifter 340 moves shifting clutch 320 and shifts dog clutch 300 between the engaged and disengaged configurations. In FIG. 3, shape-memory alloy shifter 340 is shown retracting sliding clutch 320. In FIG. 4, shape-memory alloy shifter 340 is shown extending sliding clutch 320. When shape-memory alloy shifter 340 retracts sliding clutch 320 as shown in FIG. 3, first splines 322 of sliding clutch 320 are disengaged from splines 332 of mating clutch 330. Conversely, when shape-memory alloy shifter 340 extends sliding clutch 320 as shown in FIG. 4, first splines 322 of sliding clutch 320 mesh with splines 332 of mating clutch 330. In such a manner, shape-memory alloy shifter 340 may move shifting clutch 320 in order to shift dog clutch 300 between the engaged and disengaged configurations.

Shape-memory alloy shifter 340 may have any suitable shape. For example, as shown in FIGS. 3 and 4, shape-memory alloy shifter 340 may have a helical coil shape and extend between clutch support 310 and sliding clutch 320 within clutch support 310. In particular, shape-memory alloy shifter 340 may extend between a first end portion 342 and a second end portion 344, e.g., along the axis of rotation R. Shape-memory alloy shifter 340 may be mounted or fixed to clutch support 310 at or adjacent first end portion 342 of shape-memory alloy shifter 340, and shape-memory alloy shifter 340 may be mounted or fixed to sliding clutch 320 at or adjacent second end portion 344 of shape-memory alloy shifter 340. When shape-memory alloy shifter 340 has a helical coil shape, shape-memory alloy shifter 340 may apply a uniform or constant force to sliding clutch 320 during shifting between the engaged and disengaged configurations in order to assist with smoothly shifting dog clutch 300 between the engaged and disengaged configurations. In addition, shape-memory alloy shifter 340 may be completely compressed in the disengaged configuration when shape-memory alloy shifter 340 has a helical coil shape.

Clutch support 310 also extends between a first end portion 350 and a second end portion 352, e.g., along the axis of rotation. Interior chamber 354 may extend, e.g., along the axis of rotation R, from first end portion 350 of clutch support 310 to second end portion 352 of clutch support 310. A cylindrical bearing bracket 316 of clutch support 310 is positioned within interior chamber 354 of clutch support 310 at or adjacent first end portion 350 of clutch support 310, and sliding clutch 320 may be, e.g., at least partially, positioned within interior chamber 354 of clutch support 310 at or adjacent second end portion 352 of clutch support 310. Shape-memory alloy shifter 340 may be disposed within cylindrical bearing bracket 316 of clutch support 310, e.g., at or adjacent first end portion 350 of clutch support 310.

Dog clutch 300 also includes a controller 370, such as electronic control unit 28, and a power supply 372, such as an alternator or battery, for regulating operation of shape-memory alloy shifter 340. Controller 370 and power supply 372 are shown schematically in FIGS. 3 and 4. Power supply 372 is electrically coupled to shape-memory alloy shifter 340, e.g., via suitable wiring, such that power supply 372 selectively directs an electrical current to shape-memory alloy shifter 340. Controller 370 is in operative communication with power supply 372 such that controller 370 selectively operates power supply 372 in order to supply the electrical current to shape-memory alloy shifter 340. Controller 370 may also regulate the magnitude of the electrical current from power supply 372 to shape-memory alloy shifter 340.

Controller 370 is configured for selectively actuating power supply 372 in order to adjust dog clutch 300 between the engaged and disengaged configurations. For example, controller 370 may direct power supply 372 to direct an electrical current to shape-memory alloy shifter 340 in order to extend sliding clutch 320 towards mating clutch 330 and shift dog clutch 300 to the engaged configuration, as shown in FIG. 4. As another example, controller 370 may deactivate power supply 372 in order to terminate the electrical current to shape-memory alloy shifter 340 and retract sliding clutch 320 from mating clutch 330 such that dog clutch 300 shifts to the disengaged configuration, as shown in FIG. 3. Thus, controller 370 may adjust dog clutch 300 between the engaged and disengaged configurations by selectively directing electrical current from power supply 372 to shape-memory alloy shifter 340.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An automatic transmission, comprising:
a plurality of planetary gear sets;

a plurality of shifting elements including a dog clutch that defines an axial direction, the dog clutch comprising
a clutch support;
a sliding clutch mounted to the clutch support, the sliding clutch defining a plurality of splines;
a shape-memory alloy shifter coupled to the sliding clutch, the shape-memory alloy shifter configured for moving the sliding clutch along the axial direction between an engaged configuration and a disengaged configuration; and
a mating clutch mounted to a gear of the plurality of planetary gear sets, the mating clutch defining a plurality of splines, the plurality of splines of the mating clutch meshed with the plurality of splines of the sliding clutch in the engaged configuration, the plurality of splines of the mating clutch not meshed with the plurality of splines of the sliding clutch in the disengaged configuration,
wherein the shape-memory alloy shifter extends between a first end portion and a second end portion along the axial direction, the first end portion of the shape-memory alloy shifter fixed to the clutch support, the second end portion of the shape-memory alloy shifter fixed to the sliding clutch.

2. The automatic transmission of claim 1, wherein the sliding clutch is positioned within the clutch support, the clutch support defining a plurality of splines on an inner surface of the clutch support, the sliding clutch meshing with the plurality of splines of the clutch support in order to hinder rotation of the sliding clutch relative to the clutch support.

3. The automatic transmission of claim 1, wherein the shape-memory ahoy shifter has a helical coil shape and extends between the clutch support and the sliding clutch within the clutch support.

4. The automatic transmission of claim 1, further comprising a power supply electrically coupled to the shape-memory alloy shifter, the power supply configured for directing an electric current through the shape-memory alloy shifter in the engaged configuration.

5. The automatic transmission of claim 4, wherein the electric current from the power supply heats the shape-memory alloy shifter in order to shift the sliding clutch along the axial direction from the disengaged configuration to the engaged configuration.

6. The automatic transmission of claim 1, wherein the clutch support is fixed to a transmission housing or another gear of the plurality of planetary gear sets.

7. The automatic transmission of claim 1, wherein the sliding clutch defines the plurality of splines of the sliding clutch at an inner surface of the sliding clutch and the mating clutch defines the plurality of splines of the mating clutch at an outer surface of the mating clutch.

8. The automatic transmission of claim 1, wherein the clutch support extends between a first end portion and a second end portion along the axial direction, the clutch support defining an interior chamber that extends along the axial direction from the first end portion of the clutch support to the second end portion of the clutch support, a cylindrical bearing bracket of the clutch support positioned within the interior chamber of the clutch support adjacent the first end portion of the clutch support, the sliding clutch positioned within the interior chamber of the clutch support adjacent the second end portion of the clutch support, the shape-memory alloy shifter disposed within the cylindrical bearing bracket of the clutch support.

9. The automatic transmission of claim 1, wherein the mating clutch is mounted to a sun gear of the plurality of planetary gear sets.

10. A dog clutch for an automatic transmission, comprising:
a clutch support;
a sliding clutch mounted to the clutch support, the sliding clutch defining a plurality of splines;
a shape-memory alloy shifter coupled to the sliding clutch, the shape-memory alloy shifter configured for moving the sliding clutch along an axial direction between an engaged configuration and a disengaged configuration; and
a mating clutch defining a plurality of splines, the plurality of splines of the mating clutch meshed with the plurality of splines of the sliding clutch in the engaged configuration, the plurality of splines of the mating clutch not meshed with the plurality of splines of the sliding clutch in the disengaged configuration,
wherein the shape-memory alloy shifter extends between a first end portion and a second end portion along the axial direction, the first end portion of the shape-memory alloy shifter fixed to the clutch support, the second end portion of the shape-memory alloy shifter fixed to the sliding clutch.

11. The dog clutch of claim 10, wherein the sliding clutch is positioned within the clutch support, the clutch support defining a plurality of splines on an inner surface of the clutch support, the sliding clutch meshing with the plurality of splines of the clutch support in order to hinder rotation of the sliding clutch relative to the clutch support.

12. The dog clutch of claim 10, wherein the shape-memory alloy shifter has a helical coil shape and extends between the clutch support and the sliding clutch within the clutch support.

13. The dog clutch of claim 10, further comprising a power supply electrically coupled to the shape-memory alloy shifter, the power supply configured for directing an electric current through the shape-memory alloy shifter in the engaged configuration.

14. The dog clutch of claim 13, wherein the electric current from the power supply heats the shape-memory alloy shifter in order to shift the sliding clutch along the axial direction from the disengaged configuration to the engaged configuration.

15. The dog clutch of claim 10, wherein the sliding clutch defines the plurality of splines of the sliding clutch at an inner surface of the sliding clutch and the mating clutch defines the plurality of splines of the mating clutch at an outer surface of the mating clutch.

16. The dog clutch of claim 10, wherein the clutch support extends between a first end portion and a second end portion along the axial direction, the clutch support defining an interior chamber that extends along the axial direction from the first end portion of the clutch support to the second end portion of the clutch support, a cylindrical bearing bracket of the clutch support positioned within the interior chamber of the clutch support adjacent the first end portion of the clutch support, the sliding clutch positioned within the interior chamber of the clutch support adjacent the second end portion of the clutch support, the shape-memory alloy shifter disposed within the cylindrical bearing bracket of the clutch support.

17. A dog clutch for an automatic transmission, comprising
a clutch support;

a sliding clutch mounted to the clutch support, the sliding clutch defining a plurality of splines;

a shape-memory alloy shifter coupled to the sliding clutch, the shape-memory alloy shifter configured for moving the sliding clutch along an axial direction between an engaged configuration and a disengaged configuration; and a mating clutch defining a plurality of splines, the plurality of splines of the mating clutch meshed with the plurality of splines of the sliding clutch in the engaged configuration, the plurality of splines of the mating clutch not meshed with the plurality of splines of the sliding clutch in the disengaged configuration, wherein the shape-memory alloy shifter has a helical coil shape and extends between the clutch support and the sliding clutch within the clutch support.

18. A dog clutch for an automatic transmission, comprising:

a clutch support;

a sliding clutch mounted to the clutch support, the sliding clutch defining a plurality of splines;

a shape-memory alloy shifter coupled to the sliding clutch, the shape-memory alloy shifter configured for moving the sliding clutch along an axial direction between an engaged configuration and a disengaged configuration; and a mating clutch defining a plurality of splines, the plurality of splines of the mating clutch meshed with the plurality of splines of the sliding clutch in the engaged configuration, the plurality of splines of the mating clutch not meshed with the plurality of splines of the sliding clutch in the disengaged configuration, wherein the clutch support extends between a first end portion and a second end portion along the axial direction, the clutch support defining an interior chamber that extends along the axial direction from the first end portion of the clutch support to the second end portion of the clutch support, a cylindrical bearing bracket of the clutch support positioned within the interior chamber of the clutch support adjacent the first end portion of the clutch support, the sliding clutch positioned within the interior chamber of the clutch support adjacent the second end portion of the clutch support, the shape-memory alloy shifter disposed within the cylindrical bearing bracket of the clutch support.

* * * * *